UNITED STATES PATENT OFFICE.

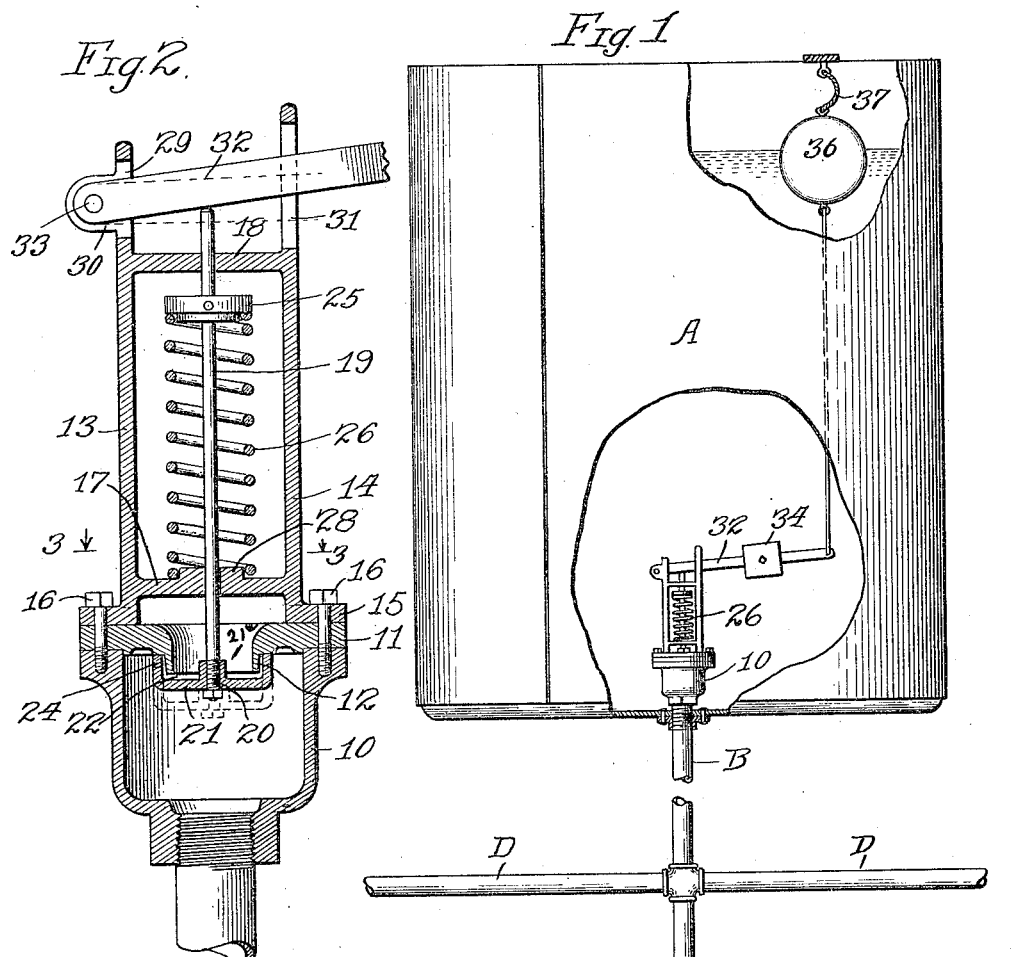

GEORGE H. BEEBE, OF MARSHALLTOWN, IOWA, ASSIGNOR TO FISHER GOVERNOR COMPANY, OF MARSHALLTOWN, IOWA.

FLOAT-VALVE.

1,125,046. Specification of Letters Patent. Patented Jan. 19, 1915.

Application filed July 21, 1913. Serial No. 780,177.

*To all whom it may concern:*

Be it known that I, GEORGE H. BEEBE, a citizen of the United States, and residing at Marshalltown, in the county of Marshall and State of Iowa, have invented new and useful Improvements in Float-Valves, of which the following is a specification.

This invention relates to float valves and has for an object to provide an efficient, practical and satisfactory device of the class described.

Among the particular objects of the invention, it is desired to provide a float valve to control the connection between an open tank or stand-pipe and the steam pump for filling the same; also to provide an efficient and practical arrangement wherein, as soon as water is drawn from the tank, the valve will remain open until the tank has emptied to its emptying limit, and wherein the valve will remain open ready for the pump to refill the tank, and will automatically close when the valve reaches its full limit, and furthermore to provide an efficient means for allowing the valve to gently return to its seat when automatically closing thereby avoiding the so-called water hammer and its damaging consequences.

These and other features, advantages and capabilities of the invention will become apparent from a detailed description of one specific embodiment of the same in which—

Figure 1 is an illustration of a water tank system equipped with the improved device. Fig. 2 is an enlarged detail in elevation of the check valve, and Fig. 3 is a cross-section on the line 3—3 of Fig. 2.

In the construction shown, A is a water tank of usual construction which is connected by a suitable pipe connection B to a steam pump C. From this pipe connection B extend the usual pipe branches D, D for a sprinkler system, factory, railroad tanks, and general use.

The valve which forms an important part of the present invention has a shell or body 10 which is cup-shaped and is secured to the opening of the pipe connection B where it enters the tank A. On the upper enlarged rim of the shell 10 is positioned an annular disk member or cover 11 which is of novel construction. At its lower inner periphery, this annular member has an annular projection or strangler 12, the outside of which is adapted to form a valve seat. On top of the annular member 11 is positioned a yoke having two uprights 13 and 14, which yoke is provided with an annular flange 15 at its base which sets on the annular disk member 11 and there by means of screws or bolts 16 which pass through the flange 15, annular disk member 11 and enlarged rim of the shell 10, the yoke and disk member 11 are held in place. Extending from one upright 13 to the other 14, there is a cross-piece 17 in the lower portion of the yoke and a cross-piece 18 in the upper portion. Each cross-piece has a central opening one in alinement with the other. Through these central openings of the cross-pieces 17 and 18, the valve stem 19 passes. The valve 21 has a central opening around the inner end of which is formed a tubular extension 21ᵃ which opening and extension are internally screw-threaded to receive the lower end 20 of the valve stem 19, a nut 23 being screwed on the end 20 of the valve stem 19 outside of the valve 21 to lock the same in place. A rim 24 is formed around the outer periphery of the valve 21, which is of sufficient size to fit the valve seat around the outside of the strangler 12.

At the upper portion of the valve stem 19, a collar 25 is adjustably mounted. The lower face of this adjustable collar 25 is adapted to engage one end of a spiral spring 26 which encircles the valve stem 19 and at its lower end sets about a projection 28 on the cross-piece 17. By means of this spring 26, the valve stem 10 is normally held in raised position thereby to maintain the valve 21 against its seat in a closed position.

In the present form of the device, the upright 13 of the yoke extends higher than the upright 14. In the lower upright 13, there is an opening 29 outside of which are formed two ears only one, 30, being shown. In the higher upright 14 just opposite the opening 29 there is provided a second and longer opening 31. An arm 32 is passed through these openings 29 and 31 and operates therein, the one end of the arm 32 being pivoted to the ears 30, by means of a pin 33. The arm 32 projects a distance out of the opening 31 on which outer portion a weight 34 is mounted, adjustable along said arm 32. At the outer end of the arm 32, a cable 35 is attached which is fastened to a float 36, at its other end. The float and its fastening means form a novel arrangement. The float 36 is fastened to the top wall of the tank A by a second cable 37. With this valve, the weight arm will need to descend but a short distance to open the valve. When the float 36 allows the weight arm to descend that distance, the float has performed its function and need descend no farther. Thus, by means of cable 37, the float 36 will always be in position to close the valve when the water rises the required extent.

In the operation of the device, when the tank A is filled as shown in Fig. 1, the valve is in closed position being held in such position by the water pressure against its bottom and the upward pull of the float 36 on the arm 32. As soon as a faucet or an outlet on one of the sprinkler arms is opened, the decrease in pressure on the bottom of the valve 21 will pull down the valve, the weight 34 assisting by pressing on the valve stem 19 against the upward pressure of the spring 26 and the float 36. The water will continue to flow out until the tank A is empty, and the valve will remain in open position until the pump is started to refill the tank and remain in such open position until sufficient water has entered to raise the float and thereby to exercise an upward pull on the weight arm 32 to automatically place the valve in a closed position. When this upward pull has commenced, the strangler 12 will come into play. When the valve has raised a sufficient distance, the water entering the tank will flow over the rim 24 and strike the strangler 12, thereby acting to retard the upward movement of the valve and thus permit the valve to close slowly and prevent the occurrence of the so-called water hammer.

While there is herein shown and described but one embodiment of the present invention, it is to be understood that various changes and modifications may be made by those skilled in the art without departing from the general scope of the invention.

Having thus described my invention, what I claim as new and desire to secure by Letters Patent is:

1. In a device of the character described, a shell arranged at the end of a pipe connection opening into a tank, a closure for the open end of the shell, said closure having an opening therethrough in alinement with the pipe connection, a flange depending from the closure, and encompassing the opening, a valve seat encompassing the base of the flange and spaced some distance from the free end of the flange, a valve stem passing through the opening, a guide for the stem outside of the shell, an upwardly opening cup shaped valve connected with the valve stem and arranged within the shell, the bottom of the valve being disposed between and in alinement with the pipe connection and the said opening, the diameter of the inside of the valve being greater than the exterior diameter of the flange, said valve encompassing and housing the flange and adapted to rest upon the valve seat, the exterior wall of the flange and the end of the flange being maintained out of contact with the valve to maintain a water space therebetween and surrounding the flange, means tending normally to move the valve to the valve seat, and means for unseating the valve against the stress of the first recited means.

2. In a device of the character described, a shell arranged at the end of a pipe connection opening into a tank, a closure for the open end of the shell, said closure having an opening therethrough in alinement with the pipe connection, a flange depending from the closure, and encompassing the opening, a valve seat encompassing the base of the flange and spaced some distance from the free end of the flange, a valve stem passing through the opening, a guide for the stem outside of the shell, an upwardly opening cup shaped valve connected with the valve stem and arranged within the shell, the bottom of the valve being disposed between and in alinement with the pipe connection and the said opening, the diameter of the inside of the valve being greater than the exterior diameter of the flange, said valve encompassing and housing the flange and adapted to rest upon the valve seat, the exterior wall of the flange and the end of the flange being maintained out of contact with the valve to maintain a water space therebetween and surrounding the flange, elastic means tending normally to move the valve to the valve seat, a lever adapted to act upon the valve stem for unseating the valve against the stress of the said elastic means, a weight adjustable upon the lever, and a float connected with the lever and adapted to move the latter against the stress of the weight.

3. In a device of the character described, a shell arranged at the end of a pipe connection opening into a tank, a closure for the open end of the shell, said closure having an opening therethrough in alinement with the pipe connection, a flange depending from the closure, and encompassing the opening, a valve seat encompassing the base of the flange and spaced some distance from the free end of the flange, a valve stem passing through the opening, a guide for the stem outside of the shell, an upwardly opening cup shaped valve connected with the valve stem and arranged within the shell, the bottom of the valve being disposed between and in alinement with the pipe connection and the second opening, the diameter of the inside of the valve being greater than the exterior diameter of the flange, said valve encompassing and housing the flange and adapted to rest upon the valve seat, the exterior wall of the flange and the end of the flange being maintained out of contact with the valve to maintain a water space therebetween and surrounding the flange, elastic means tending normally to move the valve to the valve seat, a lever adapted to act upon the valve stem for unseating the valve against the stress of the said elastic means, a weight adjustable upon the lever, a float connected with the lever, and adapted to move the latter against the stress of the weight, and means operating to support the float to limit the movement of the lever by the weight.

In witness whereof, I hereunto subscribe my name to this specification in the presence of two witnesses.

GEORGE H. BEEBE.

Witnesses:
ANNA COOK,
B. P. COLLINS.

Copies of this patent may be obtained for five cents each, by addressing the "Commissioner of Patents, Washington, D. C."